INVENTOR.
J. F. COULEUR
E. L. GLASER 3,412,382
SHARED-ACCESS DATA PROCESSING SYSTEM
John F. Couleur, Scottsdale, Ariz., and Edward L. Glaser, Arlington, Mass., assignors, by direct and mesne assignments, to Massachusetts Institute of Technology, Cambridge, Mass., a corporation of Massachusetts
Filed Nov. 26, 1965, Ser. No. 509,824
18 Claims. (Cl. 340—172.5)

ABSTRACT OF THE DISCLOSURE

A time-shared data processing system effecting multiprogramming by the employment of program segments, each segment utilizing relative addressing; wherein a plurality of registers store intermediate cell pointers for respective ones of the segments, each intermediate cell providing a reference address, and wherein an absolute address is provided for the relative address of a particular segment by retrieving the corresponding pointer from the register in which it is stored, utilizing the pointer to obtain the contents of the respective intermediate cell, and appending the relative address to the reference address contents of the intermediate cell.

---

This invention relates to a shared-access data processing system and more particularly to a multi-programmed system for simultaneously performing data processing operations for a relatively large number of users.

In a shared-access data processing system a data processor thereof quasi-simultaneously performs data processing operations for a relatively large number of users. In performing these operations, the data processor alternately services the programs supplied by the users in an extremely short cyclic period. During the interval in which the data processor is servicing each program, a portion or all of the program is executed.

A program comprises a series of instructions for directing the data processor to perform in sequence the individual steps necessary to perform a particular data processing operation. In order that the data processor can effect the required cyclic servicing of the user programs, at least a portion of each of these programs must be stored in the primary storage portion of the system. The data processor is thus enabled to instantly retrieve from primary storage and execute the next-required instruction of each user's program after discontinuing execution of the immediately preceding user's program during the servicing cycle. A data processing system alternately executing a series of programs which are completely or partially in primary storage is said to be multiprogrammed.

The form of primary storage employed in the shared-access data processing system is a cell-addressed memory group. Each of a plurality of data words is stored in a respective cell of the memory group. Data words are units of information utilized by the system and comprise instructions of programs, information to be processed, and information which is the result of processing. A data word is retrieved from or inserted into a memory cell of the cell-addressed memory group only after such memory is supplied with a unique identification or address of the cell.

Since the multiprogrammed system described requires that at least a portion of all the programs of the current users share primary storage, the system only will accept for execution from each user a self-contained ordered set of data words requiring during execution no more than a predetermined fraction of the total primary storage. A set of data words so limited in size is termed a segment.

A segment may comprise one or more identifiable portions of a program, a complete program, or a collection of programs, depending on the relative lengths of the programs and the segment.

Most instructions of a program identify memory cells for inserting processed data words or for retrieving data words for processing. Accordingly, this type of instruction comprises a cell address. In the multiprogrammed system described herein these cell addresses are relative cell addresses, thereby permitting insertion of a segment into whatever portion of primary storage is available at the time the segment is accepted for execution by the system. By employing relative addresses during execution of the segments, great flexibility in the combination of segments which may be executed at any time is provided. However, utilization of relative addresses demands that means must be provided to transform these relative addresses to corresponding absolute cell addresses for retrieval of data words to be processed and for insertion of processed data words.

Therefore, it is the principal object of this invention to provide apparatus for developing an absolute address of a cell-addressed memory from a relative address which is supplied during execution of a program in a multiprogrammed data processing system.

The data processor also provides for expeditious transfer of execution from a segment held in primary storage to another segment not presently held in primary storage. Additionally, the system provides for rapid and efficient replacement of a terminating segment with a segment awaiting execution. As has been described above, a segment is limited in size to a predetermined fractional portion of the total size of primary storage; however, the segment may be of any lesser size than the permitted maximum. As a consequence, all segments being executed at a given time are usually of different length, and a terminating segment is usually supplanted in execution by a waiting segment of different size. In the event a new segment requires a greater portion of primary storage than a terminating segment, the system would ordinarily have to relocate the remaining active segments in primary storage to provide sufficient space to accommodate the new segment.

Therefore, it is another object of this invention to provide improved apparatus for effecting the ready exchange of active segments in a multiprogrammed data processing system.

Another object of this invention is to provide apparatus for effecting the replacement of one segment by a larger segment in the primary storage of a shared-access data processing system without requiring relocation of the remaining contents of the primary storage.

To provide most efficient use of primary storage the system described enables storage of only the most active portions of currently executed segments in primary storage. Provision is made for replacement in primary storage of a portion of a segment which becomes less active with another portion of the segment requiring execution. Additionally, the system provides that the required portion of a segment not in primary storage may replace a less active portion of any other segment. These functions are implemented by automatically dividing a segment into integral portions of standard length, such portions being termed pages.

All active portions of paged segments in execution are represented in the cell-addressed memory group by their constituent pages. Whenever a page of an active segment that is not in primary storage requires execution, the page replaces one of the least active stored pages. Since all pages are of equal size, the required page is readily inserted into the same cells occupied by the page to be supplanted. Additionally, whenever execution of a new paged segment is initiated, the first required pages thereof replace the pages of the most recently terminated segment in primary storage. In this manner, the different pages of a particular segment may become scattered throughout primary storage. Accordingly, provision must be made for the relative addresses supplied during execution of any page of a particular segment to be transformed to the corresponding absolute cell addresses of any one of the pages comprising such segment. This address transformation must be implemented regardless of the location in primary storage of the page being executed and regardless of the location of the relatively addressed cells or their pages.

Therefore, it is another object of this invention to provide improved apparatus for enabling efficient communication between the pages of a segment in a multiprogrammed data processing system.

Another object of this invention is to provide apparatus for automatically locating any cell addressed relatively during execution of a page in a multiprogrammed data processing system.

In a shared-access data processing system of the type described, certain information and programs are useful to many users. For example, many users have need for trigonometric tables. Additionally many users require programs which execute routine operations such as sorting and merging. In the system described, it is desirable that users not be required to provide such common information and programs but, instead, that each user have access to common information and programs which are provided in permanent segments by the system manager. Accordingly, it is desirable that the system be provided with means for the user segments to communicate with these common segments. Therefore, apparatus shall be provided to enable each user segment to communicate with particular cells in other segments even though the user is permitted to employ only relative addressing.

Accordingly, it is an additional object of this invention to provide improved apparatus for effecting communication between different segments in a multi-programmed data processing system.

Another object of this invention is to provide apparatus for automatically locating information in any segment of a shared-access data processing system when such information is addressed during execution of any other segment.

The foregoing objects are achieved, according to one embodiment of the instant invention, and according to one mode of operation thereof, by providing, in a shared-access data processing system wherein a relative cell address is supplied by a data processor during execution of a paged segment, an intermediate segment cell address, the intermediate segment cell, in turn, providing for locating a special data word of the page being addressed, the special data word combining with the relative address to provide the absolute address of the required memory cell. When the data processor requires communication with the cell-addressed memory group to retrieve an instruction or a data word for processing or to insert a processed data word, the data processor supplies the relative address of the particular cell with which communication is required and at the same time supplies an identification of the segment in which the cell is located. A register associated with the identified segment holds a representation of the location of an intermediate cell. Each cell of a set of these intermediate cells holds the absolute address of the first cell of a page table provided in primary storage for a corresponding one of the segments, if such segment is paged. When a relative address becomes available, the apparatus of this invention responds to the contents of the above-mentioned register to retrieve the contents of the corresponding one of the intermediate cells. A first portion of the relative address, interpreted as a page number, is then combined with the address provided in the retrieved contents of the intermediate cell in order to retrieve the contents of a corresponding one of the cells of the page table of the required segment. The page table cell so retrieved provides the absolute address of the first cell of the corresponding page. The invention then combines a second portion of the relative address, interpreted as the relative location of the required cell within the page, with the address provided in the retrieval contents of the page table to provide the absolute address of the required cell.

This invention will be described with reference to the accompanying drawings, wherein.

Figure 6A:
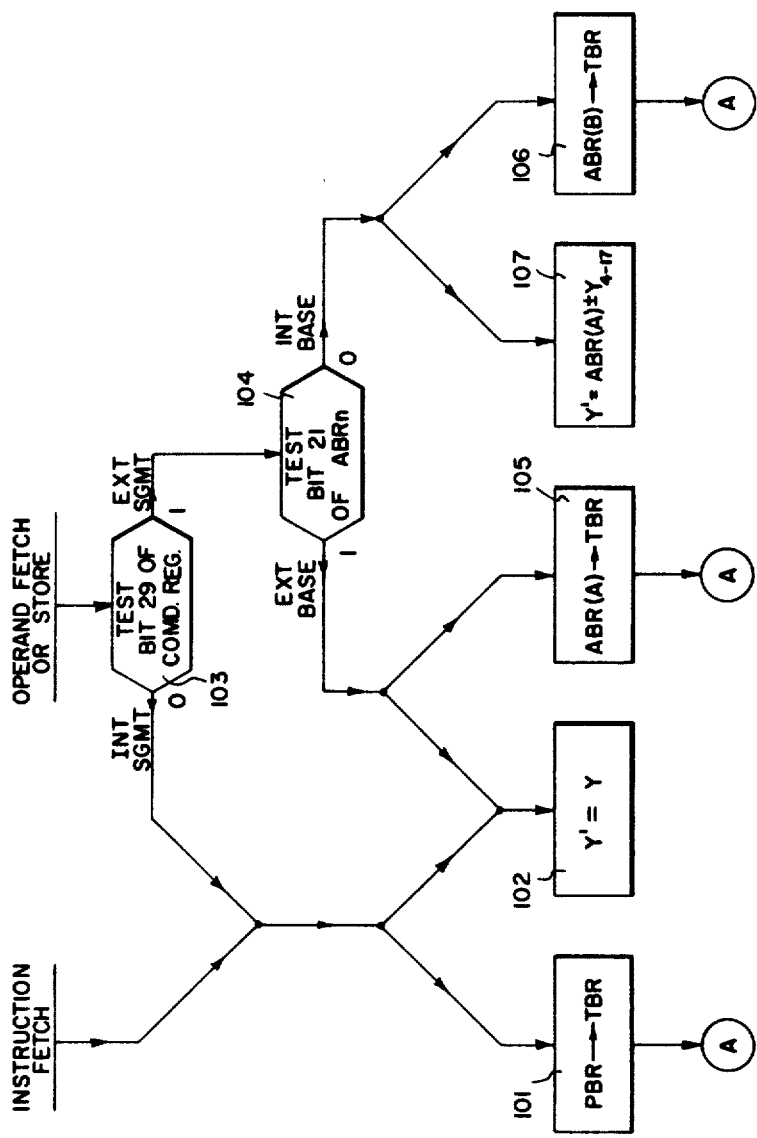
Figure 6B:
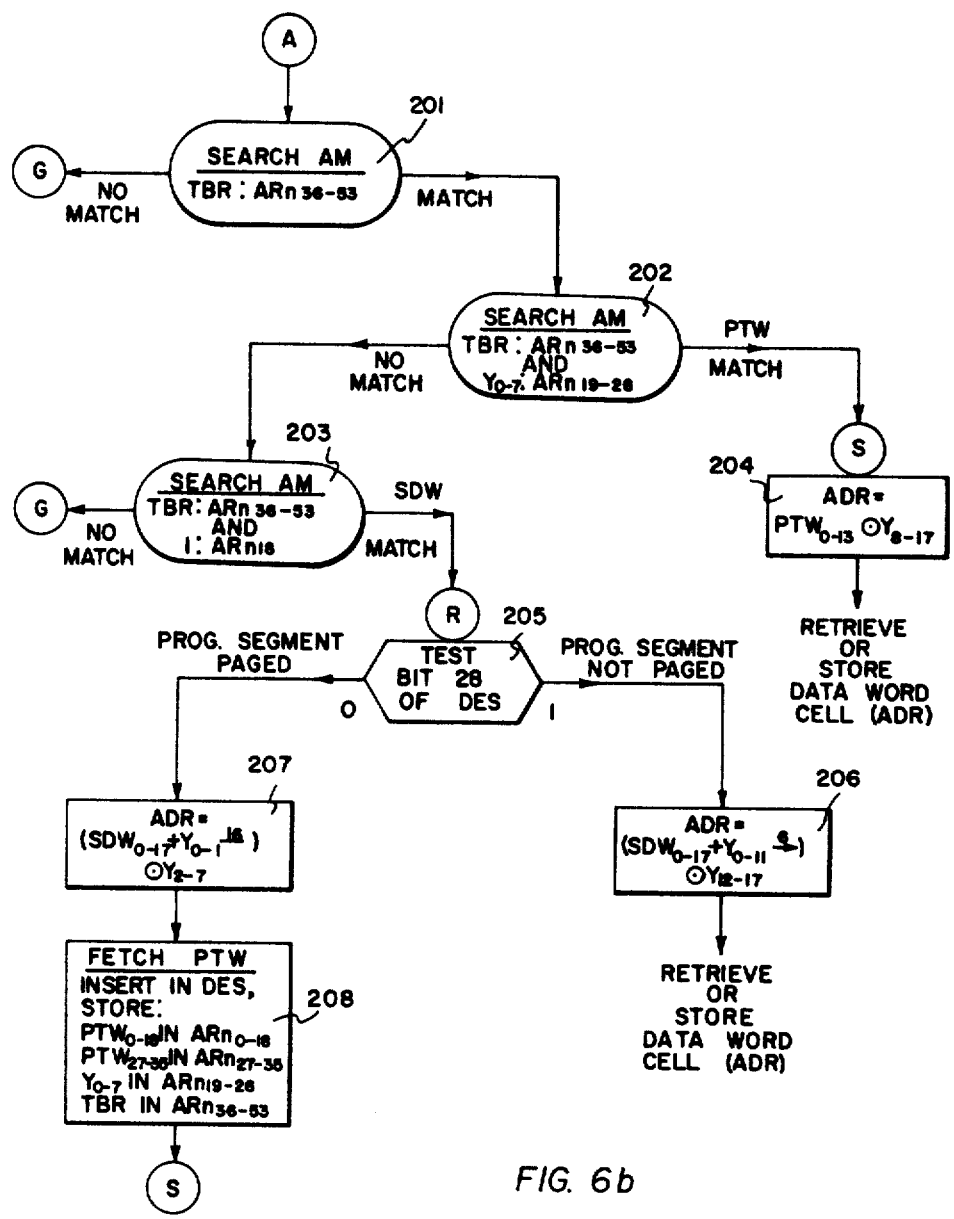
Figure 6C:
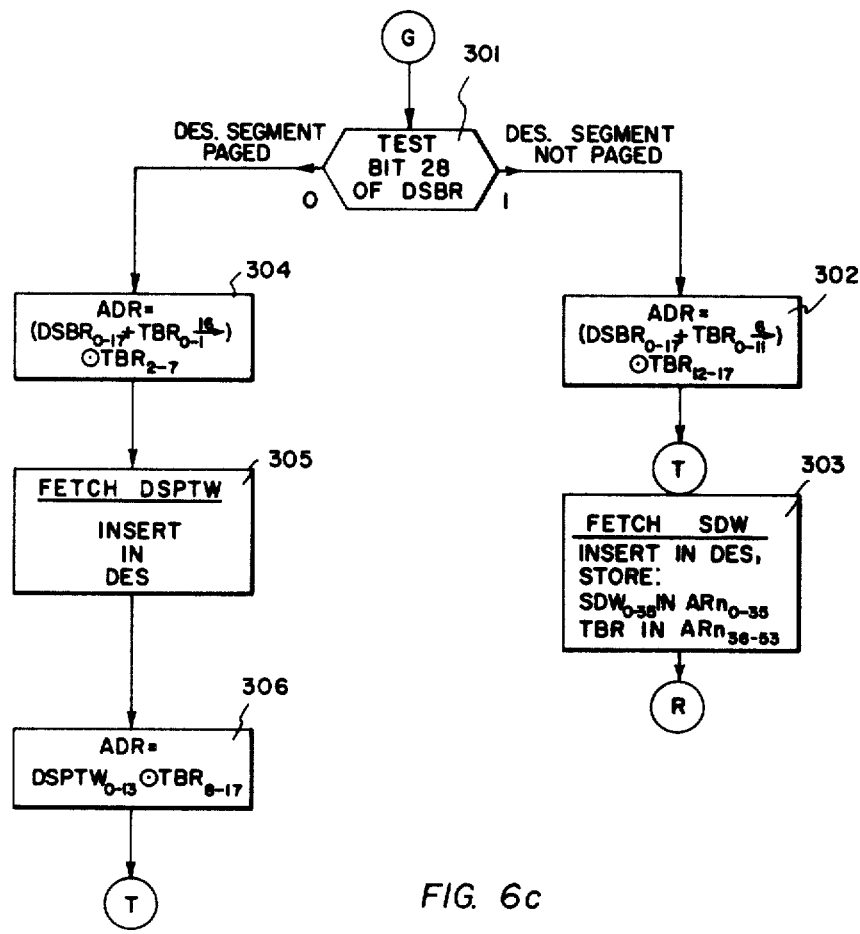

FIGURES 6a, 6b, and 6c comprise a symbolic diagram of a sequence of operations executed by the Data Processor in preparing an address for a Cell-Addressed Memory.

Figure 1:
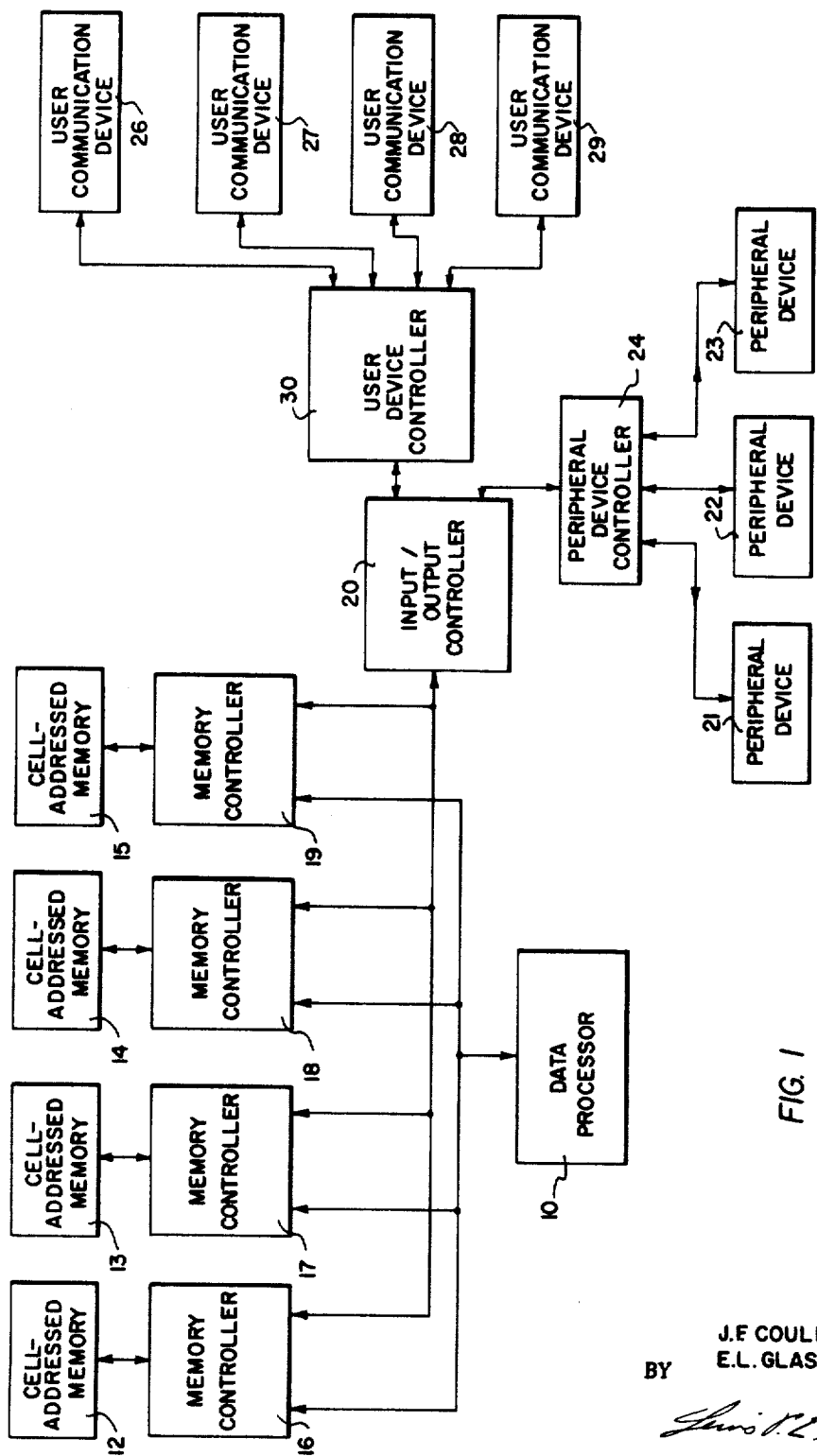
FIGURE 1 is a block diagram of a Shared-Access Data Processing System to which the instant invention is applicable.

The Shared-Access Data Processing System of FIGURE 1 simultaneously performs data processing operations for a relatively large number of users. In performing these operations the System alternately services the programs supplied by the users, during each interval in which the System is servicing a program all or a part of the program being executed.

A Data Processor 10 executes the data processing functions required by the programs. Thus, Data Processor 10 alternately responds to a plurality of distinct instructions of different user programs to perform corresponding data processing operations on information received by the Processor. The instructions of each program are supplied to the Processor in the sequential order necessary to control the Processor to execute the corresponding data processing operations. Accordingly, the Processor executes a predetermined maximum number of instructions of a user program before proceeding to service the next program. During each service interval the Processor may execute all the instructions of an entire user program or only part thereof.

A plurality of Cell-Addressed Memories 12, 13, 14, and 15 store data words representing information which is to be processed, data words representing information which is the result of processing, and data words representing instructions of the programs to be executed by the Data Processor. Each data word is stored in a discrete memory location, or cell. For a data word to be inserted into or retrieved from a particular cell, the Memory must be supplied with an identification, or address, of the cell.

Each of a plurality of Memory Controllers 16–19 communicates with and controls access to a respective one of Memories 12–15; supplying cell addresses to the Memory, supplying data words for insertion into the addressed cells, and receiving data words retrieved from the addressed cells.

Data Processor 10 communicates wtih one or more of Memories 12–15 through their respective Memory Controllers to receive instructions and data words for processing, and to transmit for storage data words which result from data processing operations.

Input/Output Controller 20 executes a limited number of instructions to function as an automatic information transfer apparatus, providing communication between Memory Controllers 16–19 and a plurality of external devices. These external devices supply information for processing, supply programs to process the information, and receive the processed result information. One form of external device is designated generally herein as Peripheral Devices 21, 22, and 23. These Peripheral Devices include, for example, magnetic discs, drums and tape handlers; punched card and paper tape readers; and document readers. This form of Peripheral Device stores information and programs as mechanical representations, and during retrieval of the stored information converts these mechanical representations to corresponding electrical signals and transmits the signals to a Peripheral Device Controller 24. Controller 24 provides transfer of the electrical signals delivered by a Peripheral Device to Input/Output Controller 20. Other of the Peripheral Devices 21, 22, and 23 function to automatically receive processed information and convert it to a form specified by the system user, including, for example: magnetic tape handlers and card punches, which receive and store processed information for subsequent use by a data processing system, and high speed printers which display the processed information for immediate use. This latter form of Peripheral Device receives electrical signals from Controller 24 and converts these signals to the requisite mechanical representations. The electrical signals are received by Peripheral Device Controller 24 from Input/Output Controller 20.

An additional plurality of external devices, designated as User Communication Devices 26, 27, 28, and 29, each under direct manual control of a user, supplies programs for execution by Processor 10 and supplies control information for initiating and controlling the execution of programs stored in Peripheral Devices 21–23. Communication Devices 26–29 also supply information for processing and display processed information. Electrical typewriters and cathode-ray devices are presently among the most common apparatuses employed as User Communication Devices. A User Device Controller 30 provides transfer of electrical signals representing the programs, information for processing, and control information supplied by Communication Devices 26–29 to Input/Output Controller 20. Additionally, Controller 30 transfers signals representing processed information and control information supplied by Input/Output Controller 20 to User Communication Devices 26–29.

Input/Output Controller 20 controls the transfer of the signals received thereby from Controllers 24 and 30 to one or more of Memories 12–15 through their respective Memory Controllers 16–19. Input/Output Controller 20 controls the transfer of signals received thereby from one or more of Memories 12–15 to one of Controllers 24 and 30.

Accordingly, the System of FIG. 1 provides immediate and simultaneous data processing services for a plurality of users, each user communicating with the System through a respective User Communication Device to initiate and control the execution of programs, to supply data for processing, and to receive and display processed data. The System alternately executes the programs of all users who may at any time be directly communicating with the System, limiting the maximum delay experienced by each such user to a time commensurate with his reaction time. In this way the System performs enough continuous processing for each individual user to meet his needs or to match the input and output speed capabilities of his Communication Device. As a consequence the user is unaware that the Processor is not continuously serving his needs and the plurality of users are provided quasi-simultaneous use and control of the System.

The Shared-Access Data Processing System of FIGURE 1 processes information represented by the binary code. In the binary code each element of information is represented by a binary digit, also termed a "bit," each binary digit being either a 1 or a 0. The binary 1 may be represented by a relatively positive electrical signal and the binary 0 by a relatively negative electrical signal.

The unit of information primarily employed in processing is termed the data word. The data word in the System of FIGURE 1 comprises 36 bits. Three types of data words are employed, the operand word, the instruction word, and the special function word.

The operand word is a data word on which an arithmetic or logical operation is performed by Processor 10, or which is the result of a data processing operation performed by Processor 10. Thus, the operand word represents information which is to be processed and which is received from one of Memories 12–15 by Processor 10, or information which is the result of processing and which is transmitted to one of Memories 12–15 by a DAP. Input/Output Controller 20 transfers operand words from source Peripheral Devices or User Communication Devices to Memories 12–15 or from these Memories to receiving Peripheral Devices or User Communication Devices.

The instruction word is employed by Processor 10 to direct a discrete step in the data processing operation being executed. The instruction word is received from core of Memories 12–15 by Processor 10. Although Input/Output Controller 20 transfers instruction from Peripheral Devices and User Communication Devices to Memories 12–15, it ordinarily does not transfer instructions from these Memories to User Communication Devices and only infrequently does it transfer instructions from these Memories to Peripheral Devices.

Most of the instruction words comprise command and address portions. The command represents the nature of the step to be executed by Processor 10, so that when an instruction is received by Processor 10 the command controls the Processor to execute the represented step.

The address portion represents a cell in one of Memories 12–15 from which a data word is to be retrieved for processing or in which a processed data word is to be stored. Normally the instruction address portions of a particular program represent a series of locations in a Cell-Addressed Memory from which information to be processed is obtained, a series of locations in which processed information is to be stored, and a series of locations in which the incomplete results of intermediate processing steps are stored. In the instant invention the instruction address portion does not constitute an actual cell address for identifying a particular cell but, instead, only represents the location of a cell in one of Memories 12–15 relative to a reference location. Accordingly, the address supplied by an instruction word is termed a "relative address." A relative address is transformed to the absolute address of a particular cell in a particular one of Memories 12–15 by the apparatus of the instant invention.

In addition to the relative addresses provided by instruction words, Processor 10 supplies the relative address of a cell in Memories 12–15 whenever the Processor requests the next instruction word in the program it is executing. This relative address is also transformed to an absolute cell address of a particular one of Memories 12–15 by the apparatus of the instant invention.

The special function words are employed by Processor 10 to control the apparatus of the instant invention to transform a relative address to the absolute address of a particular cell in a particular one of Memories 12–15. Descriptions of the different types of special function words employed in the instant invention will be described hereinafter.

Certain terms have particular significance in the description of the invention. The meaning of these terms is set forth below:

*Absolute Address.*—A number supplied to Memories 12–15 which identifies uniquely a cell therein.

*Appending.*—The operation of Data Processor 10 in developing an absolute address from a relative address.

*Base Address.*—The absolute address of the first of a set of sequentially addressable cells from which the relative locations of the remaining cells of the set are determined. For example, the absolute address of the lowest numbered cell of the block containing a page is the base address for the page. The word number of a relative address which locates a data word within a particular page represents an address relative to the page base address.

*Block.*—A set of sequentially addressable cells in Memories 12–15. In this embodiment the block comprises 1024 cells, the base address of a block being an integral multiple of 1024. A page is stored in a block.

*Descriptor Word.*—A data word employed to describe characteristics of and to provide the base address of a segment, page table or page. A Segment Descriptor Word includes the base address of a corresponding segment, if the segment is non-paged, or the base address of the corresponding segment page table, if the segment is paged. A Page Table Word is a descriptor word which includes the base address of a page of the corresponding segment.

*Effective Address.*—The relative address supplied by Data Processor 10 in the appending operation. If the corresponding segment is paged, the effective address is interpreted to comprise a page number and word number. If the corresponding segment is not paged, the effective address is employed as an entity.

*K.*—The decimal number 1024. Ten binary digits can represent 1024 different decimal numbers. For convenience the symbol K, which in other circumstances is employed to represent the number 1,000, is employed here to represent the frequently occurring number 1024. Thus, 2K represents 2048, etc.

*Page.*—A uniform subdivision of a segment. In this embodiment the page represents 1024 cells. A page is stored in a block in Memories 12–15.

*Page Number.*—The most significant portion of an effective address employed during execution of a page. The page number identifies one of the pages into which a segment is divided.

*Page Table.*—The set of Page Table Words of a corresponding segment. The page table is stored in a set of sequentially addressable cells in Memories 12–15.

*Page Table Word (PTW).*—A descriptor word employed to locate the base of a page (see "descriptor word").

*Pointer.*—A set of bits employed as an identification of a descriptor word or as a relative address.

*Relative Address.*—A number employed during execution of a user segment which represents the address of a cell in Memories 12–15 relative to the base address of the segment.

*Segment.*—The maximum-sized ordered collection of data words which the System will accept for execution. In the instant embodiment, this maximum size is 256K data words. The segment may comprise one or more subroutines of a program, a single program or a collection of programs. A segment is identified by a unique name. The address portions of the instructions of a segment are relative addresses, representing a closed set of cells in Memories 12–15, and normally starting from the number zero. The portion of a segment being executed that is stored in Memories 12–15 at any time varies during execution of the segment. A segment during execution may be divided into uniformly sized portions, termed "pages."

*Segment Descriptor Word (SDW).*—A descriptor word employed to locate a base of a segment or page table (see "descriptor word").

*Word Number.*—The least significant portion of an effective address employed during execution of a paged segment. The word represents the address of a cell in a page relative to the base address of the page.

The Shared Access Data Processing System executes the programs of a predetermined number of users in quasi-simultaneous manner by alternately executing these programs in an extremely short cyclic period so as to limit the maximum delay experienced by each user to a time commensurate with his reaction time. To effect the required cyclic operation, each of the programs to be executed during the cycle must have at least a portion thereof in Cell-Addressed Memories 12–15. In this manner, Processor 10 can immediately retrieve and execute the next required instruction of one user's program after discontinuing execution of the immediately preceding user's program during the cyclic operation. Hence, the users must share the total storage capacity of the Cell-Addressed Memory group.

Therefore, since the programs of all current users must share the available Cell-Addressed Memory group storage space, the System will accept for execution from each user a self-contained ordered set of data words requiring no more than a predetermined fraction of this total available storage space. Such a set of data words is termed a segment (explained previously). In the instant embodiment the Cell-Addressed Memory group contains a total of 16,384K cells. The absolute address capable of addressing any cell in the Memory group comprises 24 bits. However, since the total addressing capability permitted a segment is 256K cells, the relative address provided in a segment comprises 18 bits.

Accordingly, the System actually executes in cyclic order the segments provided by the users. The relative addresses provided in the segment instructions are 18 bits in length and, therefore, if a program requires more than 256K cells for complete execution, the users must fragment the program into integral segments requiring 256K words or less. The segment must be executed within a virtual memory represented by the relative addresses which start at relative location zero and continue inclusive, through all possible addresses to the maximum relative location 262,143. The segments actually supplied by the users will not contain 262K data words; instead, many of the relative addresses will refer to locations for receiving data words which are the result of processing operations.

A segment is written with relative addresses to permit storage thereof in whatever portion of the Cell-Addressed Memory group is available at the time the segment is supplied for execution by Input/Output Controller 20. Accordingly, the employment of relative addresses provides for great flexibility in the combination of segments which may be executed at any one time. Furthermore, upon completion of execution of a segment the next waiting segment may be inserted anywhere in Memories 12–15, since the addresses are relative only to the base of the segment. The instant invention provides for transforming the relative addresses of each segment to corresponding absolute addresses in the section or portion of Memories 12–15 to which the segment has been assigned for execution.

An Executive System comprising the Operating Supervisor programs maintains the Shared-Access Data Processing System in normal operative condition by providing administration of all user programs and other necessary accompanying activities. This administration is asserted from the initial request for execution of a user segment through its execution and completion. Thus, the Operating Supervisor maintains tables of all waiting programs and all programs in cyclic execution. The Operating Supervisor also proivdes the necessary functions for terminating each user program and initiating the next waiting user program.

Additionally, to enable the various users to share the equipment effectively, the Operating Supervisor, in combination with the instant invention, insures that the available resources, including the peripheral devices, are properly allocated, and prevents unwanted interference between users. Thus, the Operating Supervisor controls information transfers between various components of the System of FIGURE 1, recognizes interrupt conditions from components requiring service, schedules segments, allocates Cell-Addressed Memory space among current users, provides memory protection to insure that each user restricts his activities to certain storage areas only, executes "privileged" instructions that are not executable to the individual users, and accounts for the time used by the plurality of programs of the users.

Figure 2:
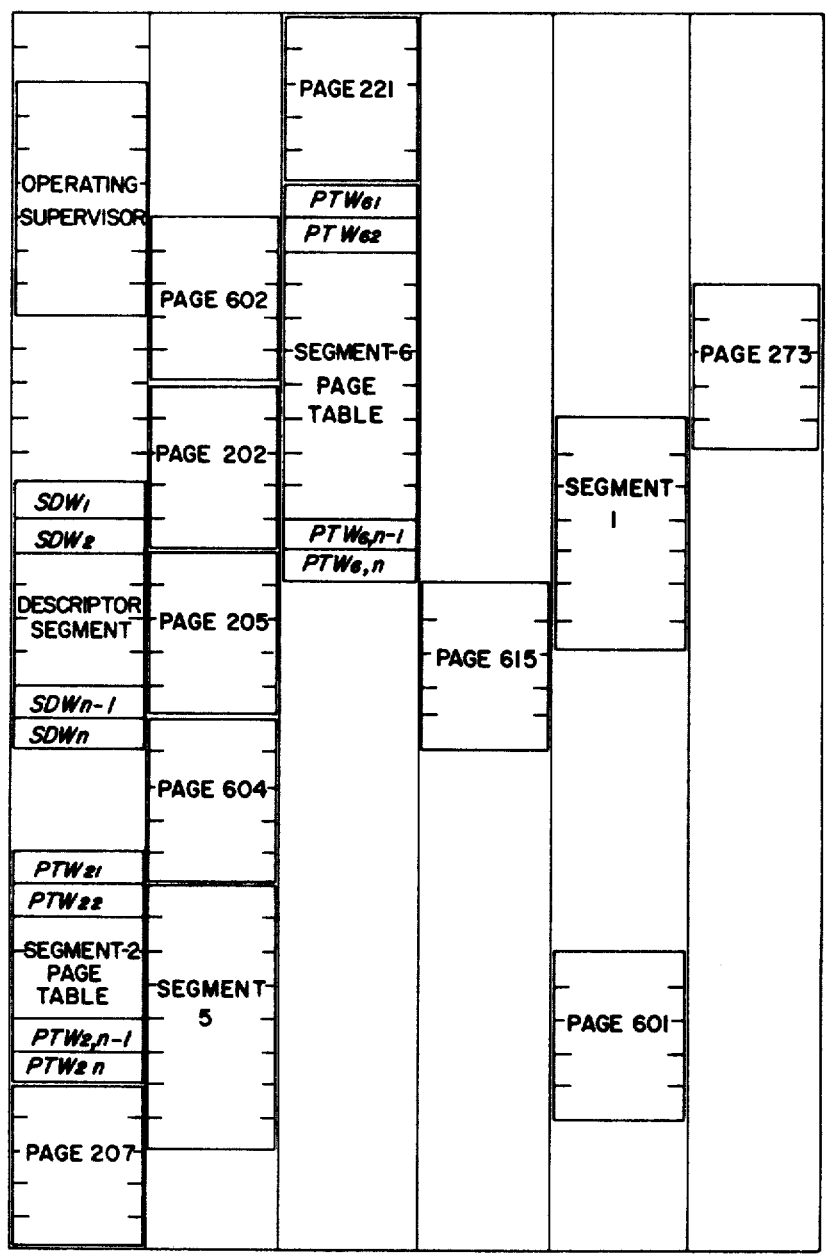
FIGURE 2 is a symbolic diagram of one form of organization of a Cell-Addressed Memory.

A major portion of the Executive System and Operation Supervisor programs is stored in the Cell-Addressed Memory group, as shown in FIGURE 2, which is a symbolic diagram of the general organization of information in the Cell-Addressed Memory group. An additional portion of the Executive System comprises a segment, designated as the Descriptor Segment, which is stored entirely within the Cell-Addressed Memory. The Descriptor Segment provides a representation of the base address of each segment that has been stored in whole or in part in the Cell-Addressed Memory group. Thus, the Descriptor Segment contains a Segment Descriptor Word (SDW) for each segment currently being executed. The Segment Descriptor Word contains control information relating to the segment and provides the base address of all current non-paged user segments or the base address of all page tables for current paged user segments. Utilizing the base address provided by a segment Descriptor Word, the relative addresses provided during execution of a segment are transformed by the instant invention to corresponding actual addresses of cells in the Cell-Addressed Memories.

The System of FIGURE 1 provides for expeditious transfer of execution from a portion of a segment in Memories 12–15 to any portions of the segments not presently in the Memories. Additionally, the System provides for rapid and efficient replacement of a terminating current segment with a segment awaiting execution. As has been described above, although the maximum execution size of a segment is limited to 256K cells, a segment may be of any lesser length. As a consequence, all segments being executed at a given time are usually of different lengths and a terminating segment is usually supplanted in execution by a waiting segment of different size.

The instant invention eliminates the need to relocate current segments and other programs in the Cell-Addressed Memory group when a new segment of greater length than a terminating segment commences execution. Additionally, the invention enables storage of only the active portions of a current segment in Memories 12–15 and provides for the replacement of these portions if they become less active with required portions of the segment. Furthermore, the invention provides that the required portions of a segment may replace the less active portions of any other segment. These functions are initiated by the Operating Supervisor, in combination with the instant invention, automatically dividing user segments into portions of standard length to accommodate predetermined number of sequential relative addresses, these portions being termed pages. A page, in the instant embodiment, is intended to occupy a block of 1024 cells in Memories 12–15. All active portions of paged segments in execution are represented in Memories 12–15 by their paged elements. Whenever a page of an active segment which is not stored in Memories 12–15 requires execution, the Operating System, in combination with the instant invention, replaces one of the least active stored pages with the required page. Since all pages are equal size, the required page is readily inserted into the block occupied by the page to be supplanted. Additionally, whenever execution of a new paged segment is initiated, the first required pages thereof are inserted into the blocks of Memories 12–15 formally occupied by the pages of the most recently terminated segment.

The paging function of the instant invention is illustrated in FIG. 2 wherein pages 207, 202, 205 221, and 273 are five of the active pages of the segment identified as Segment 2, these active pages being illustrated as scattered throughout the entire Cell-Addressed Memory group. FIGURE 2 also shows pages 602, 604, 615, and 601 interspersed with other segments, pages and programs in the Memory group.

The Operating System frequents the segments according to their relative addresses, starting with relative address zero. Thus, the first page of a paged segment includes relative addresses 0–1023, the second page 1024–2047, and the third segment, 2048–3071, etc. When these pages are stored in the available blocks of the Memories 12–15, the instant invention provides for locating the base address of each such page by employment of a page table for each paged segment. The page table comprises a set of descriptor words, identified as Page Table Words (PTW), and PTW being included for each page of the segment. A PTW contains control information relating to the corresponding page and provides the base address of the page. During the execution of a paged segment the relative addresses employed are interpreted as comprising both a page number and a word number, the page number identifying a particular page, and the word number providing the relative location of the required cell within such page. The instant invention combines the word number of a relative address and the base address in the corresponding Page Table to provide the absolute address of the required cell.

A segment contains a maximum of 256 pages and therefore, a page table contains a maximum of 256 Page Table Words. The Page Tables of paged Segment 2 and Segment 6 are illustrated in FIGURE 2. In the instance wherein a segment is paged, the corresponding Segment Descriptor Word, rather than containing the base address of the segment, contains the base address of the corresponding page table. Accordingly, the instant invention provides for developing the absolute address of a cell required in a paged segment by first locating the base address of the corresponding segment page table from the appropriate Segment Descriptor Word, and then entering the page table to determine from the Page Table Word identified by the page number of the relative address the base address of the corresponding page.

If the Descriptor Segment is of substantial length, it, too, may be paged. In such event, a Descriptor Segment page table is provided for providing the base addresses of the pages of the Descriptor Segment. The contents of the Descriptor Segment page table are termed Descriptor Segment Page Table Words (DSPTW). The descriptor segment illustrated in FIG. 2 is not paged.

Figure 3:
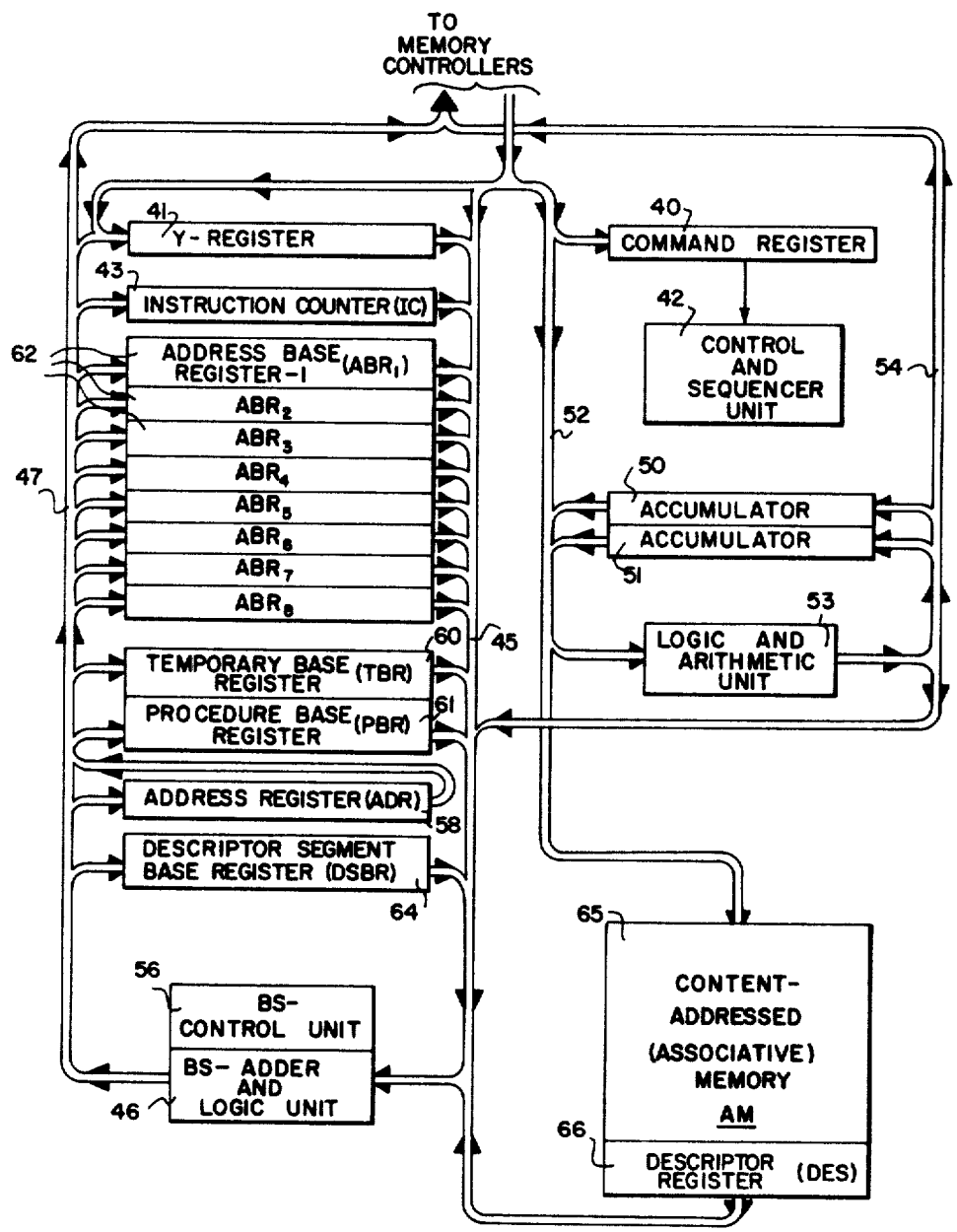
FIGURE 3 is a block diagram of the major components of the Data Processor of the System of FIGURE 1.
Figure 4:
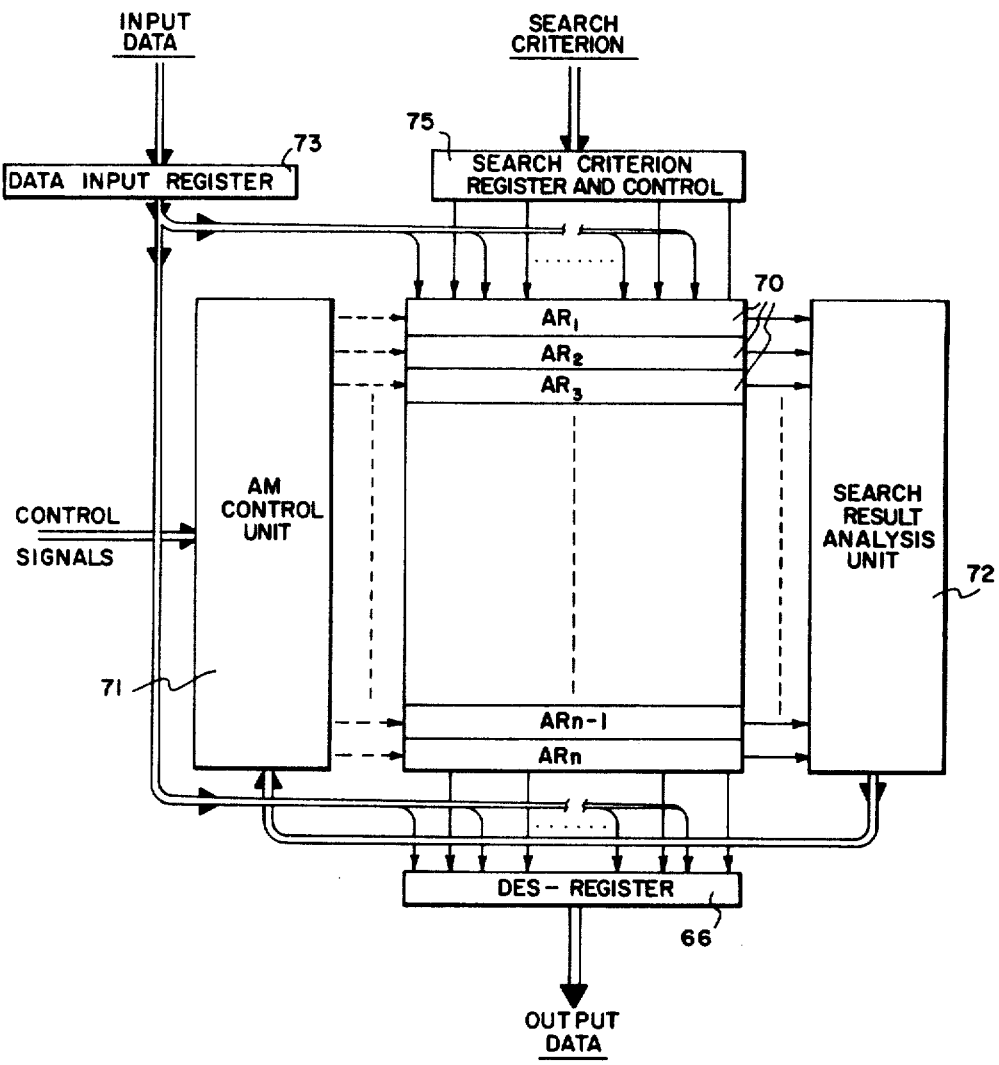
FIGURE 4 is a block diagram of the Content-Addressed Memory of the Data Processor.

The principal components and functions of the instant invention are provided in Data Processor 10, these components being illustrated in FIGS. 3 and 4, and the functions being diagrammed in FIG. 6. The apparatus so described provides transformation of relative addresses into absolute addresses and provides controllable restrictions on the type of communication which may be made with the addressed data words.

Figure 5:
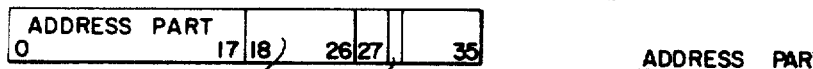
FIGURE 5 is a symbolic diagram of the binary digital structure of various data words employed in the System.
Figure 5:
Figure 5:
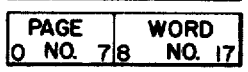
Figure 5:
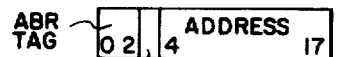
Figure 5:
Figure 5:
Figure 5:
Figure 5:
Figure 5:
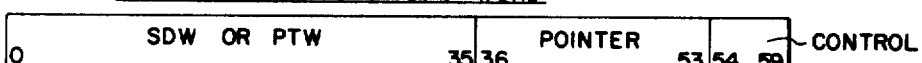
Figure 5:
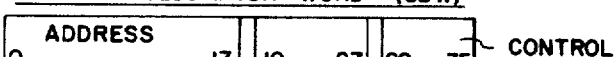
Figure 5:
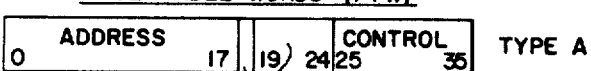
Figure 5:
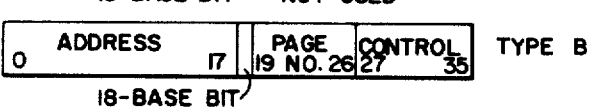

The Data Processor responds to a plurality of distinct instructions to execute a plurality of corresponding data processing steps. The instructions are obtained in sequential order from Memories 12–15 and are inserted as they are received into a Command Register 40 and a Y-Register 41. The bit structure of the instruction is shown in FIG. 5. The least significant portion, bits 18–35, of the instruction is inserted into Command Register 40. Bits 18–35 include a command portion, bits 18–26, an external segment bit, bit 29, and other control information. The command portion determines the particular type of data processing step the System executes.

The contents of Command Register 40 are applied to a Control and Sequencer Unit 42. Control and Sequencer Unit 42 decodes and otherwise interprets the contents of the Command Register and transmits control signals, not shown, for controlling the handling and processing of data words throughout the entire System of FIG. 1. Additionally, Control and Sequencer Unit 42 generates and distributes timing signals, not shown, for controlling the sequential execution of the substeps in each data processing step performed.

The most significant portion, bits 0–17, of the instruction inserted into Y-Register 41. The most significant portion of the instruction comprises a relative address of the type described heretofore. Prior to being transformed to an absolute address by the instant invention, the relative address in the Y-Register may be developed by the well-known indexing, modification, or indirect address techniques. The final relative address which is transformed by the instant invention to an absolute address is termed the effective address, and is also stored in the Y-Register. Accordingly, the effective address may be the original relative address provided in the instruction or an address developed therefrom.

An Instruction Counter 43 stores the relative address of the next instruction to be employed, the contents being incremented once during execution of each instruction so that instructions may be retrieved in sequence from Memories 12–15. Accordingly, the Instruction Counter stores an 18 bit relative address as shown in FIG. 5. The relative address of Instruction Counter 43 is transferred on a Data Bus 45, through a BS-Adder and Logic Unit 46, and on a Data Bus 47 to Y-Register 41, where it is employed as the effective address for retrieving the next instruction from the Cell-Addressed Memory group.

Although the path shown for transfer of the contents of Counter 43 is illustrated in FIG. 3 as comprising Data Bus 45, Logic Unit 46, and Data Bus 47 in sequence, it is within the scope of the invention and state of the art to provide other direct transfer paths. For example, it is well-known in the art to transfer the contents of one Register, such as Instruction Counter 43, directly to another Register, such as Y-Register 41.

In the operation of the instant invention, the effective address which is transformed to an absolute address may be interpreted in two different ways. If the cell addressed by the relative address is in a non-paged segment, the effective address is interpreted as an 18 bit relative address capable of relatively addressing any one of 256K different cells (Type A of the instruction word, the IC word, and the Y-Register words, FIG. 5). On the other hand, if the cell addressed is in a paged segment, the relative address is interpreted to comprise two parts, a page number and including bits 0–7 for identifying one of 256 different pages within the segment, and a word number and including bits 8–17 for representing the relative address of one of the 1024 cells within the identified page (Type B of the instruction word, the IC word, and the Y-Register word, FIG. 5).

A pair of Accumulators 50 and 51 is each adapted to provide temporary storage of operands including data to be processed or data which is the result of processing, each such operand comprises 36 bits. When an operand is retrieved from a cell of Memories 12–15 denoted by an absolute address, it is transmitted on Data Bus 52, through Logic and Arithmetic Unit 53, and on Data Bus 54 to one of Accumulators 50 and 51, under control of Control and Sequencer Unit 42. The contents of either of Accumulators 50 and 51 may be transferred to a cell in Memories 12–15 denoted by an absolute address, by transmission through Logic and Arithmetic Unit 53 and on Data Bus 54. Logic and Arithmetic Unit 53, under control of Unit 42, performs arithmetic operations, such as addition or subtraction, or logical operations, such as editing functions, on operand words received directly from Memories 12–15 and from Accumulators 50 and 51.

A BS-Adder and Logic Unit 46 performs arithmetic and logical operations on relative addresses in developing effective addresses and absolute addresses. Unit 46 operates under control of a BS-Control Unit 56. Unit 56 controls the source register from which data words are received by Unit 46, the function performed by Unit 46, and the particular register to receive the processed result data word provided by Unit 46.

An Address Register 58, identified as the ADR-Register, stores the finally-developed absolute address that is used for denoting the particular cell in Memories 12–15 into which a data word is inserted or from which a data word is retrieved. The absolute address stored in the ADR-Register comprises 24 bits and thereby addresses any one of the 16,384K cells of the Cell-Addressed Memory group.

A Temporary Base Register 10, identified as the TBR-Register, stores the pointer of the current address transformation operation. The pointer stored in the TBR-Register is a special function word comprising 18 bits. This pointer, illustrated in FIGURE 5, is employed either as an identification of a descriptor word, or as the relative address of the descriptor word. As a relative address, the pointer is interpreted to be either an 18 bit relative address or joint page number and word number.

A Procedure Base Register 61, identified as the PBR-Register, stores the pointer of the current procedure segment. The current procedure segment is the particular segment from which the current instruction sequence is being retrieved and, therefore, the segment represented by the current relative address in Instruction Counter 43. The pointer stored in the PBR-Register is interpreted similarly to the pointer of the TBR-Register.

A plurality of Address Base Registers 62, each identified as an ABR-Register, stores special function words identified as the ABR words. A particular ABR-Register is identified as the ABR$_n$-Register, where $n$ is a numeral. Eight ABR-Registers are provided in the instant embodiment. The ABR word, FIGURE 5, comprises 24 bits. The most significant portion, bits 0–17, of the ABR word is employed either as a pointer or as an internal address modifier for modifying the effective address within the segment of operation. If the most significant portion of the ABR word is employed as a pointer, the pointer is interpreted as described above with respect to the TBR-Register contents. The least significant portion, bits 18–23, of the ABR word comprises control information, wherein bit 21 is employed to indicate whether the most significant portion of the ABR word is to be utilized as a pointer or as an internal address modifier. If the most significant portion is to be used as an internal address modifier, bits 18–20 of the ABR word contain an identification of another one of the ABR-Registers wherein the most significant portion is utilized as a pointer.

During the operation transforming the effective address to an absolute address, either the contents of the PBR-Register or the contents of an ABR-Register are transferred to the TBR-Register, whereupon the resulting pointer in the TBR-Register is employed in the ensuing sequence.

A Descriptor Segment Base Register 64, identified as the DSBR-Register, stores a special function word identified as the DSBR word. The DSBR word, FIG. 5, comprises 36 bits. The most significant portion, bits 0–17, of the DSBR word comprises either the base address of the Descriptor Segment or the base address of the Descriptor Segment page table. The least significant portion, bits 18–35, of the DSBR word comprises control information, wherein bit 28 denotes whether the Descriptor Segment is paged.

A Content-Addressed Memory 65 stores a plurality of special function words. Memory 65 is also termed as an associative memory, and designated AM. A special function word stored in Memory 65 is identified as an AR word, FIG. 5. Each AR word is stored in a discrete storage location in Content-Addressed Memory 65. For a data word to be retrieved from Memory 65 the Memory must be supplied with a search criterion that matches a predetermined portion of the data word contents of one of the storage locations.

A Descriptor Register 66, identified as the DES-Register, receives each special function word retrieved from Memory 65.

The AR word, FIG. 5, comprises 60 bits. The most significant portion, bits 0–35, of the AR word is either a Segment Descriptor Word (SDW word) or a Page Table Word (PTW word). The least significant portion, bits 36–59, of the AR word comprises a pointer, bits 36–53, and control information, bits 54–59. The pointer of the AR word is the primary portion thereof employed for providing a match with a search criterion.

The Segment Descriptor Word, FIG. 5, is a special function word comprising 36 bits. The most significant portion, bits 0–17, comprises the base address of a corresponding segment or segment page table. The least significant portion, bits 18–35, of the SDW word comprises control information, wherein bit 18 denotes whether the word is a Segment Descriptor Word or Page Table Word, and wherein bit 28 denotes whether the corresponding segment is paged.

The Page Table Word, FIG. 5, is a special function word comprising 36 bits. The most significant portion, bits 0–17, comprises the base address of a corresponding page. The least significant portion, bits 18–35, of the PTW word comprises control information wherein bit 18 denotes whether the word is a Segment Descriptor Word or a Page Table Word. A Page Table Word when stored in Content-Addressed Memory 65 (type B, FIG. 5) also comprises a page number, bits 19–26. A Page Table Word when stored in one of Cell-Addressed Memories 12–15 does not contain a page number (type A).

When an ABR-Register is to be employed as an internal address modifier, the modifier contents of the ABR-Register are transferred on Data Bus 45 to BS-Adder and Logic Unit 46 and combined therein with the contents of Y-Register 41, which are also transferred on Data Bus 45 to Unit 46. In this instance, the result output signals of Unit 46 are then returned to Y-Register 41 and comprise a modified effective address.

When a Segment Descriptor Word or Descriptor Segment Page Table Word is to be retrieved from the Cell-Addressed Memory group, the contents of DSBR-Register 64 are transferred to Unit 46 and combined therein with the contents of the TBR-Register 60, which are also transferred to Unit 46. In this instance, the result output signals of Unit 46 represent an absolute address and are thereupon transferred to ADR-Register 58.

When a Page Table Word is to be retrieved from the Cell-Addressed Memory group, the effective address in the Y-Register is transferred to Unit 46 and combined therein with the contents of DES-Register 46, which are also transferred to Unit 46. In this instance, the result output signals delivered by Unit 46 represent an absolute address and are thereupon transferred to the ADR-Register.

Various types of content-addressed memories are known in the art. One form suitable for employment as Content-Addressed Memory 65 is shown in FIG. 4. Each of a plurality of storage locations 70 contains a special function AR word. An AM Control Unit 71 receives external control signals, such as from Control and Sequencer Unit 42 and BS-Control Unit 56 of the Data Procesor and internal control signals from a Search Result Analysis Unit 72, and in response to these control signals performs functions including controlling search operations, controlling the entry of special function data words into storage locations 70, and transferring the contents of these storage locations to DES-Register 66. The DES-Register functions as an output register for the Content-Addressed Memory.

A Data Input Register 73 receives special function data words, primarily from the Cell-Addressed Memory group. The contents of Register 73 are transferred to one of storage locations 70 and inserted therein under control of AM Control Unit 71. A Search Criterion Register and Control 75 stores the search criterion and controls the particular contents of storage locations 70 which are compared with the search criterion. Control 75 normally receives search criteria from TBR-Register 60 and Y-Register 41 of the Data Processor.

A Search Result Analysis Unit 72 receives a signal from each storage location 70 indicating whether certain contents of this storage location is the same as (matches) the search criterion in Control 75. Analysis Unit 72 delivers signals to AM Control Unit 71 indicating whether a match has occurred and denoting the particular one of storage locations 70 for which a match has been indicated. In response to these signals AM Control Unit 71 can direct the transfer of the contents of the corresponding ones of storage locations 70 to the DES-Register.

One mode of operation of the instant invention will now be described by reference to the diagrams of FIGS. 6a, 6b, and 6c, which relate to the operation of the System shown in FIGS. 1, 3, and 4.

The operation illustrated in FIG. 6 is provided to obtain the absolute address of a cell in Memories 12–15 from which the next instruction or an operand is to be obtained or into which an operand is to be inserted. At the beginning of the operation to be described an effective address is provided in Y-Register 41.

If the operation is to provide the absolute address of the cell containing the next instruction, the effective address has been transferred to Y-Register 41 from Instruction Counter 43. In this instance, as shown in FIG. 6a, the pointer in PBR-Register 61 is now transferred to TBR-Register 60 (substep 101), inasmuch as the instruction to be retrieved is within the procedure segment from which the current sequence of instructions is being obtained. No change is made in the effective address when the TBR-Register is loaded with the current pointer (substep 102). Data Processor 10 next prepares to initiate a search of Content-Addressed Memory 65 for a match with the TBR pointer, the initiation of this search being designated by the letter A in FIGS. 6a and 6b.

If the operation is to provide the absolute address of the cell from which an operand is to be retrieved (fetch) or into which an operand is to be inserted (store), the effective address has originated from the most significant portion of the instruction currently being executed. The original relative address provided by the most significant portion of the instruction may comprise the present effective address in the Y-Register, or it may have been developed into the present effective address by indexing, modification, or indirection. During an operand fetch or store bit 29 of the instruction being executed is tested by Control Unit 42 in its temporary storage position in Command Register 40 (substep 103). If bit 29 is a binary 1 the operand is to be retrieved from or inserted into a cell of a segment other than the current procedure segment. A segment other than the current procedure segment is termed an "external" segment. If bit 29 is a binary 0 the operand is to be retrieved from or inserted into a cell of the current procedure segment.

If the result of substep 103 requires address development within the current procedure segment, the previously described substeps 101 and 102 are executed, so that the current pointer in the TBR-Register will be that of the current procedure segment.

If the result of substep 103 requires address development external to the current procedure segment the instruction being executed provides an identification of one of ABR-Registers 62 for employment in the next substep of the development. If bit 29 of the instruction is a binary 1, bits 0–2, which are in the Y-Register, identify the one of the eight ABR-Registers to be first employed (instruction word type C, FIG. 5). Bit 21 of the particular ABR-Register identified by the current instruction is now tested by Control Unit 56 (substep 104). If bit 21 is a binary 1 the most significant 18 bits of this ABR-Register comprise a pointer for the external segment in which the required cell is located. If bit 21 is a binary 0 the most significant 18 bits of this ABR-Register comprise a relative address for modifying the effective address, and thereby provide a new effective address for the external segment.

If the result of substep 104 denotes that the ABR-Register contains a pointer for the external segment, this pointer comprising bits 0–17 is now transferred to the TBR-Register (substep 105). The notation ABR(A) in substep 105 represents the contents of the ABR-Register identified by the original instruction. No change is made in the effective address (substep 102).

If the result of substep 104 denotes that the ABR-Register contains a relative address for effective address modification, control bits 18–20 of the same ABR word provide an identification of another ABR-Register, which contains the pointer for the required external segment. The pointer in this second-identified ABR-Register is now transferred to the TBR-Register (substep 106), the notation ABR(B) representing the contents of the ABR-Register identified by the first-identified ABR-Register. At the same time, the effective address is modified by the relative address in the first-identified ABR-Register (substep 107). Bits 0–17 of this ABR-Register are added algebraically, by the BS-Adder, to bits 4–17 of the effective address in the Y-Register. Bits 0–2 of the Y-Register contents provided an identification of the first ABR-Register and are not part of the numerical portion of the effective address in this instance. Bit 3 is employed as a sign bit to enable algebraically adding the effective address and the address modifier, thereby providing greater flexibility in address development.

As has been described above, the eight ABR-Registers contain pointers and address modifiers for employment when a cell external to the current procedure segment is to be addressed whereas the PBR-Register contains a pointer for the current procedure segment. One method of providing the required contents of these nine registers comprises employing the Operating Supervisor to load the PBR-Register and all ABR-Registers to be employed whenever execution of a procedure segment is initiated.

Immediately following the loading of the TBR-Register with the current pointer (substeps 101, 105, or 106) Data Processor 10 initiates a search operation in Content-Addressed Memory 65 for an AR word containing the same pointer, bits 36–53. The object of the search, FIG. 6b, is to determine whether Memory 65 contains the Segment Descriptor Word for the required segment, if the segment is non-paged, or the Page Table Word for the required page if the required segment is paged. By storing Segment Descriptor Words and Page Table Words in Associative Memory 65, development of absolute addresses is more rapid than if those descriptor words were in the Cell-Addressed Memory group. However, since associative memories are costly they must be limited in size. Therefore, only the most active SDW's and PTW's can be stored in Memory 65, and the remainder of these descriptor words must be stored in the Call-Addressed Memory group.

The search operation of Memory 65 is based on several factors. Only one descriptor word, the SDW, is provided for the non-paged segment. This SDW comprises the base address of the corresponding segment. The SDW and one PTW for each page are provided for the paged segment. The paged segment SDW comprises the base address of the corresponding segment page table and each PTW comprises the base address of the corresponding page. Since the base address of a page table is employed herein only for locating a PTW within its page table, if both the required PTW and its parent are present in the Associative Memory, only the PTW need be retrieved to develop the required absolute address. An additional factor on which the search operation is based is that bit 18 of both types of descriptor words denotes whether the word is a PTW or an SDW. Finally, all PTW's and SDW's contain the pointer for the corresponding segment, and, in addition, all PTW's in the Associative Memory contain their corresponding page number.

Relying on the above factors, the Associative Memory search operation requires a maximum of three individual searches, or passes, to provide the required PTW or SDW, if either is present. The first search determines whether any descriptor word for the required segment is present. If such a descriptor word is present a second search is made to determine whether the descriptor words located include the required PTW. If not, a third search is made to determine whether the descriptor word or words determined to be present in the first search include the required SDW.

In the first search (substep 201) the search criterion comprises only the TBR pointer. The contents of the TBR-Register are transferred to Control 75 of the Associative Memory. The search criterion is compared with bits 36–53, the included pointers, of all AR words. Search Result Analysis Unit 72 receives match signals from each storage location 70 in which the search criterion finds a matching pointer. If one or more match signals issue, Analysis Unit 72 delivers a signal to AM Control Unit 71 for initiating a second search. The detection of at least one match in the first search indicates that at least one descriptor word for the required segment is in the Associative Memory, the required segment being identified by the pointer in the TBR-Register. If no match signal issues there is no descriptor word in the Associative Memory for the required segment, so that the corresponding SDW must be retrieved from the Cell-Addressed Memory group before the address can be further developed. The search operation is terminated by Control Unit 71. The initiation of the SDW retrieval operation is designated by the letter G in FIGS. 6b and 6c.

In the second search (substep 202) the search criterion conjointly comprises the TBR pointer and the required page number. Bits 0–7 of the Y-Register, which are interpreted to represent the required page number of a paged segment, are transferred to Control 75 of the Associative Memory. The pointer portion of the conjoint search criterion is again compared with bits 36–53 o fthe AR words and the page number portion of the search criterion is simultaneously compared with bits 19–26 of the AR words, FIG. 5. Analysis Unit 72 receives a match signal from a storage location 70 in which the search criterion finds both a matching pointer and a matching page number. If a match signal issues, Analysis Unit 72 delivers a signal to AM Control Unit 71 for terminating the search operation. Inasmuch as the pointer and page number combination comprise a unique value, the detection of a match in the second search indicates that the storage location 70 delivering the match signal contains the required Page Table Word. AM Control Unit 71 thereupon transfers the contents of this storage location 70 to DES-Register 66. If no match signal issues in the second search, the required PTW is not present in the Associative Memory, and Analysis Unit 72 delivers a signal to Control Unit 71 for initiating a third search.

In the third search (substep 203) the search criterion conjointly comprises the TBR pointer and a binary 1 in the 19th bit position. The third search is required because the two previous searches have determined that one or more descriptor words for the required segment are present in the Associative Memory, but that these descriptor words do not include the required PTW, if the segment is paged. Accordingly, the third search is made to determine whether the descriptor words in the Associative Memory which correspond to the required segment include the Segment Descriptor Word. Bit 18 of each descriptor word is a binary 1 if the descriptor word is an SDW and a binary 0 if the descriptor word is a PTW. Accordingly, by providing a bit 1 in the 19th bit position of the search criterion, only SDW's will be located.

Analysis Unit 72 receives a match signal from a storage location 70 in which the search criterion finds both a matching pointer and a bit 18 which is a binary 1. If a match signal issues, Analysis Unit 72 delivers a signal to AM Control Unit 71 for transferring the contents of the storage location 70 delivering the match signal to the DES-Register. If no match signal issues in the third search, the descriptor words found in the first search have been determined to be only PTW's of the required segment, but not the required PTW, if the segment is paged. Accordingly, the corresponding SDW must be retrieved from the Cell-Address Memory group.

If the required Page Table Word is found in the second search, it is transferred into the DES-Register and the required absolute address can now be generated using this PTW. Bits 0–13 of this PTW represent the base address of the required page. Since the base address of the block in which a page is stored a divisible by the decimal number 1024, a complete 24 bit base address for a page contains zeros in the ten least significant bits. Accordingly, the base address represented by the Page Table Word comprises the 14 most significant bits of the absolute base address of the corresponding page. The word number, bits 8–17 of the effective address, represents the location of the required cell of the page relative to the page base address. Therefore, bits 0–13 in the DES-Register are transferred to Logic Unit 46 and concatenated therein (designated by the symbol $\odot$) with the word number transferred to Logic Unit 46 from the Y-Register. In the concatenation operation, a 24 bit absolute address is formed employing as the most significant portion thereof the 14 bits received from the DES-Register and as the least significant portion thereof, the 10 bits of the word number received from the Y-Register. This concatenation operation is designated as substep 204 and also by the letter S in FIG. 6b. The resulting output signals delivered by Unit 46 are thereupon transferred to the ADR-Register, whereupon they are subsequently employed to identify the particular cell of Memories 12–15 from which a Data Word is retrieved or into which a Data Word is inserted.

If the required SDW is found in the third search, it is transferred into the DES-Register. It must now be determined whether the corresponding segment is paged. If the segment is paged, the PTW of the required page must be first obtained using the base address of the page table in the SDW, before the absolute address can be developed. If non-paged, the entire segment lies in contiguous locations in the Cell-Addressed Memory, so that the segment base address represented in the SDW provides sufficient information for developing the final absolute address. Accordingly, paging bit 28 of the SDW now occupying the DES-Register is tested by Control Unit 56 (substep 205). If bit 28 is a binary 1, the corresponding program segment is not paged whereas if bit 28 is a binary 0, the program segment is paged. Substep 205 is also designated by the letter R.

If substep 205 determines that the SDW in the DES-Register represents a non-paged segment, the final absolute address can now be generated. Accordingly, bits 0–17 in the DES-Register are transferred to Logic Unit 46 and combined therein with the effective address provided by the Y-Register (substep 206). To generate the 24 bit absolute address, the most significant 12 bits of the effective address are added to the least significant 12 bits of the 18 bits provided by the DES-Register. This is denoted in substep 206 by the arrow and superscribed 6, which represent that effective address bits 0–11 are shifted to the right through 6 bit positions (toward the lower order bit positions) by Logic Unit 46 prior to being added to the corresponding bits of the SDW. The least significant 6 bits of the effective address are concatenated with the sum result. The segment base address represented by bits 0–17 of the SDW is an absolute address divisible by the decimal number 64, i.e., a 24 bit absolute address containing zeros in the 6 least significant bits. The effective address represents the location of the required cell of the segment relative to the segment base address. Thus, the result provided by Logic Unit 46 in substep 206 represents an absolute address displaced from the segment base address by a number of cells equal to the effective address. The result output signals delivered by Unit 46 are thereupon transferred to the ADR-Register, whereupon they are employed to identify the final required cell of Memories 12–15.

If substep 205 determines that the SDW in the DES-Register represents a paged segment, the cell address of the required PTW now must be generated. At this time, the DES-Register contains a representation of the base address of the page table storing the required PTW. Accordingly, bits 0–17 in the DES-Register are transferred to Logic Unit 46 and combined therein with the page number provided by the Y-Register (substep 207). To generate the 24 bit absolute cell address of the required PTW, the most significant two bits of the page number are added to the least significant two bits of the 18 bits provided by the DES-Register. This is denoted in substep 207 by the arrow and superscribed 16, which represents that page number bits 0 and 1 are shifted to the right through 16 bit positions by Logic Unit 46 prior to being added to the corresponding bits of the SDW. The least significant 6 bits of the page number are concatenated with the sum result. The page table base address represented by bits 0–17 of the SDW is an absolute address divisible by the decimal number 64. The page number represents the location of the required PTW of the page relative to the page table base address. Thus, the result provided by Logic Unit 46 in substep 207 represents an absolute address displaced from the page table base address by a number of cells equal to the page number.

The result output signals delivered by Unit 46 are thereupon transferred to the ADR-Register, whereupon they are employed to identify the cell of Memories 12–15 storing the required PTW. Employing this absolute address, the required PTW is retrieved and inserted in the DES-Register (substep 208). Inasmuch as the corresponding page is now active, Control Unit 71 also transfers this newly retrieved PTW into one of the storage locations 70 which contains one of the least active AR words in the Associative Memory. Control Unit 71 transfers PTW bits 0–18 into bit positions 0–18 of the selected storage location 70, and bits 27–35 into bit positions 27–35 of the selected storage location. At this time the page number of this Page Table Word, provided by bits 0–7 of the Y-Register, are transferred into bit positions 19–36 of the selected storage location 70. Finally, the current pointer in the TBR, representing the segment of which the corresponding page is a part, is transferred into bit positions 36–53 of the storage location 70. Control bits 54–59 in this storage location 70 are adjusted by Control Unit 71 to represent the relative activity of this AR word and to indicate limitations on the accessability of the corresponding page.

The Data Processor next develops the final absolute address, employing the page base address portion of the PTW word in tht DES-Register. Accordingly, following retrieval of the Page Table Word from the Cell-Addressed Memory group and its storage in the DES-Register (substep 208), the Data Processor controls the execution of substep 204 to develop from the Page Table Word in the DES-Register the required absolute address.

If the search operation determines that the Associative Memory contains neither the required PTW, if the segment is paged, nor the SDW of the required segment, paged or non-paged, the SDW of the required segment must be retrieved from the Cell-Addressed Memory. The Descriptors Segment Base Register stores a representation of the base address of the Descriptor Segment, if the Descriptor Segment is non-paged, or stores the base address of the Descriptor Segment page table, if the Descriptor Segment is paged. Bit 28 of the DSBR word denotes whether the Descriptor Segment is paged. Hence, the first substep which must be excuted in obtaining the required SDW is to determine whether the Descriptor Segment is paged. Accordingly, paging bit 28 of the DSBR word in the DSBR-Register is tested by Control Unit 56 (substep 301). If bit 28 is a binary 1, the Descriptor Segment is not paged, whereas if bit 28 is a binary 0, the Descriptor Segment is paged.

If substep 301 determines that the Descriptor Segment is not paged, the absolute address of the required SDW can now be generated. Accordingly, bits 0–17 in the DSBR-Register are transferred to Logic Unit 46 and combined therein with the pointer provided by the TBR-Register (substep 302). To generate the 24 bit absolute address of the required SDW, the most significant 12 bits of the pointer are added to the least significant 12 bits of the 18 bits provided by the DSBR-Register. This is denoted in substep 302 by the arrow and superscribed 6, which represent that pointer bits 0–11 are shifted to the right through 6 bit positions by Logic Unit 46 prior to being added to the corresponding bits of the DSBR word. The least significant 6 bits of the pointer are concatenated with the sum result. The Descriptor Segment base address represented by bits 0–17 of the DSBR word is an absolute address divisible by the number 64; i.e., a 24 bit absolute address containing zeros in the six least significant bits. The pointer represents the location of the required Segment Descriptor Word in the Descriptor Segment relative to the Descriptor Segment base address. Thus, the result provided by Logic Unit 46 in substep 302 represents an absolute address displaced from the Descriptor Segment base address by a number of cells equal to the value of the pointer.

The result output signals delivered by Unit 46 are thereupon transferred to the ADR-Register, whereupon they are employed to identify the cell of Memories 12–15 storing the required SDW. Employing this absolute address, the required SDW is retrieved and inserted into the DES-Register (substep 303). Inasmuch as the corresponding segment is now active, Control Unit 71 also transfers this newly retrieved SDW into one of storage locations 70 which contains one of the least active AR words in the Associative Memory. Control Unit 71 transfers SDW bits 0–35 into bit positions 0–35 of the selected storage location 70 and transfers the current TBR pointer, which represents the segment of the retrieved SDW word, into bit positions 36–53 of the storage location 70.

The Data Processor next develops the final absolute address employing the segment base address portion of the SDW word in the DES-Register. Accordingly, following retrieval of the SDW from the Cell-Addressed Memory group and its storage in the DES-Register (substep 303), the Data Processor controls the execution of substep 205 to develop from the SDW in the DES-Register the required final absolute address.

If substep 301 determines that the Descriptor Segment is paged, the cell address of the required Descriptor Segment Page Table Word (DSPTW) must now be generated. Accordingly, bits 0–17 in the DSBR-Register are transferred to Logic Unit 46 and combine therein with the most significant 8 bits of the pointer in the TBR-Register (substep 304) to generate the 24 bit absolute address of the DSPTW. The most significant eight bits of the pointer represent the page number of the Descriptor Segment page wherein the required SDW is stored. To generate the 24 bit absolute address of the DSPTW, the most significant two bits of the pointer page number are added to the least significant two bits of the 18 bits provided by the DSBR-Register. This is denoted in substep 304 by the arrow and superscribed 16, which represent that the pointer bits 0 and 1 are shifted to the right through 16 bit positions by Logic Unit 46 prior to being added to the corresponding bits of the DSBR word. The least significant six bits of the pointer page number are concatenated with the sum result. The Descriptor Segment page table base address represented by bits 0–17 of the DSBR word is an absolute address divisible by the decimal number 64. The pointer page number represents the location of the required DSPTW relative to the page table base address. Thus, the result provided by Logic Unit 46 in substep 304 represents an absolute address displaced from the Descriptor Segment page table base address by a number of cells equal to the pointer page number.

The result output signals delivered by Unit 46 are thereupon transferred to the ADR-Register, whereupon they are employed to identify the cell of Memories 12–15 storing the required DSPTW. Empoying this absolute address, the required DSPTW is retrieved and inserted in the DES-Register (substep 305).

The Data Processor next develops the absolute address of the required Segment Descriptor Word in the Descriptor Segment Page represented by the retrieved DSPTW. Accordingly, following retrieval of the DSPTW from the Cell-Addressed Memory Group and its storage in the DES-Register, bits 0–13 of the DSPTW in the DES-Register are transferred to Logic Unit 46 and concatenated therein with the pointer word number transferred to Logic Unit 46 from the TBR-Register (substep 306). In the concatnation operation, a 24 bit absolute address is formed employing as the most significant portion thereof the 14 bits received from the DES-Register, which represent the base address of the corresponding Descriptor Segment page and, as the least significant portion thereof, the 10 bits of the pointer word number received from the TBR-Register, which represent the location of the required SDW in the Descriptor Segment page realtive to the Descriptor Segment page base address. Thus, the result provided by Logic Unit 46 in substep 306 represents an absolute address displaced from the base of the Descriptor Segment Page by a number of cells equal to the pointer word number. The result output signals delivered by Unit 46 are thereupon transferred to the ADR-Register, whereupon they are subsequently employed to identify the particular cell of Memories 12–15 from which the SDW is retrieved. Employing this absolute address, the required SDW is retrieved and inserted in the DES-Register (substep 303). The final required absolute address can now be developed from the SDW contents of the DES-Register.

Accordingly, there has been described herein a Shared-Access Data Processing System employing multi-programming, wherein great flexibility in the combination of segments provided by the users is provided, wherein rapid and efficient replacement of a terminating segment with a segment awaiting execution is provided, wherein efficient communication between the pages of a segment is provided, wherein efficient location of any cell addressed relatively during execution of a page or segment is provided, and wherein ready communication between different segments and pages is provided.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In combination: a data storage member for storing a data word in each one of a plurality of addressable storage cells; means for generating a signal group representing the location of a first of said cells relative to a reference one of said cells; a register for storing a representation of the location of a second of said cells, said second cell storing the address of said reference cell; means activated following generation of said signal group and responsive to the contents of said register for controlling delivery of a signal set representing the contents of said second cell; and means responsive to said signal set and to said signal group for generating the address of said first cell.

2. A data processing system comprising a data storage member for storing a data word in each one of a plurality of addressable storage cells; a data processor for executing data processing operatings on data words received from said storage member, said processor supplying a signal group representing the location of a first of said cells relative to a reference cell when said processor requires a data word for processing; a register for storing a representation of the location of a second of said cells, said second cell storing the address of said reference cell; means controlled when said signal group is generated and responsive to the contents of said register for controlling delivery of a signal set representing the contents of said second cell; and means responsive to said signal set and to said signal group for generating the address of said first cell.

3. In combination: a data storage member for storing a data word in each one of a plurality of allressable storage cells; means for generating a signal group representing the location of a first data cell relative to a first reference cell; a first register for storing a representation of the location of a second data cell relative to a second reference cell; said second data cell storing the address of said first reference cell; a second register for storing the address of said second reference cell; means activated following generation of said signal group for combining the contents of said first and second registers for generating the address of said second data cell; means responsive to the address of said second data cell for generating a signal set representing the contents of said second data cell; and means for combining said signal set and said signal group for generating the address of said first data cell.

4. A data processing system comprising a data storage member for storing a data word in each one of a pluarlity of addressable storage cel:s; a data processor for executing data processing operations on data words received from said storage member, said processor supplying a signal group representing the location of a first data cell relative to a first reference cell when said processor requires a data word for processing; a first register for storing a representation of the location of a second data cell relative to a second reference cell; said data cell storing the address of said first reference cell; a second register for storing the address of said second reference cell; means controlled when said signal group is generated for combining the contents of said first and second registers for generating the address of said second data cell; means responsive to the address of said second data cell for generating a signal set representing the contents of said second data cell; and means for combining said signal set and said signal group for generating the address of said first data cell.

5. For employment with data processing means and a data storage member; said member storing a data word in each one of a plurality of addressable storage cells; said processing means being adapted to receive data words from said member, to execute a plurality of different operations on received data words and to transfer data words representing the results of said operations to said member; said processing means supplying a signal group when said processing means is to communicate with said storage member, said signal group representing the location of a first of said cells relative to a first reference address, an address development means comprising: storage means for storing a representation of the location of a second of said cells relative to a second reference address, said second cell storing said first reference address; means controlled by generation of said signal group and responsive to the contents of said storage means for providing the address of said second cell; means responsive to said second cell address for generating a signal set representing the first reference address stored in said second cell; and means responsive to said signal set and to said signal group for generating the address of said first cell.

6. For employment with data processing means and a data storage member; said member storing a data word in each one of a plurality of addressable storage cells; said processing means being adapted to receive data words from said member, to execute a plurality of different operations on received data words and to transfer data words representing the results of said operations to said member; said processing means supplying a signal group when said processing means is to communicate with said storage member, said signal group representing the location of a first of said cells relative to a first reference address and the location of a third of said cells relative to a third reference address; an address development means comprising: storage means for storing a representation of the location of a second of said cells relative to a second reference address, said second cell storing said third reference address, said third cell storing said first reference address; means controlled by generation of said signal group and responsive to the contents of said storage means for providing the address of said second cell; means responsive to said second cell address for generating a first signal set representing the contents of said second cell; means responsive to the first signal set and to a first portion of said signal group for generating the address of said third cell; means responsive to said third cell address for generating a second signal set representing the first reference address stored in said third cell; and means responsive to said second signal set and to a second portion of said signal group for generating the address of said first cell.

7. In combination: a data storage member for storing a data word in each one of a plurality of addressable storage cells; means for generating a signal group representing the location of a first of said cells relative to a first reference cell and the location of a third of said cells relative to a third reference cell; a register for storing a representation of the location of a second of said cells; said third cell storing the address of said first reference cell; means activated following generation of said signal group and responsive to the contents of said register for controlling delivery of a first signal set representing the contents of said second cell; means responsive to the first signal set and to a first portion of said signal group for controlling delivery of a second signal set representing the contents of said third cell; and means responsive to said second signal set and to a second portion of said signal group for generating the address of said first cell.

8. In combination: a data storage member for storing a data word in each one of a plurality of addressable storage cells; apparatus for generating a first signal group representing the location of a first of said cells relative to a first reference address when said apparatus requires to communicate with said first cell; a first register for storing a second reference address; a second register for storing the address of a second of said cells relative to said second reference address, said second cell storing said first reference address; first combining means for combining the contents of said second register with the contents of said first register to generate a second signal group representing the address of said second cell; means controlled following the generation of said second signal group for transferring said second signal group to said data storage member to control said data storage member to deliver a signal set representing the contents of said second cell; and second combining means for combining said first signal group with said signal set to generate the address of said first cell.

9. In combination: a data storage member for storing a data word in each one of a plurality of addressable storage cells, said data storage member storing a plurality of program segments in different regions thereof and storing a table of decriptor words, said table comprising a descriptor word for each of said segments, each of said descriptor words comprising the address of the base of the corresponding segment; appartus for generating a first signal group representing the location of one of the data words of one of said segments relative to the base of said one segment; a first register for storing the address of the base of said descriptor table; a second register of storing a representation of the location of the descriptor word of said one segment relative to the base of said descriptor table; first combining means for combining the contents of said second register with the contents of said first register to generate a second signal group representing the address of the descriptor word of said one segment; means controlled following the generation of said second signal group for transferring said second signal group to said data storage member to control said data storage member to deliver a signal set representing the descriptor word of said one segment; and second combining means for combining said first signal group with said signal set to generate the address of said one data word.

10. In combination: a data storage member for storing a data word in each one of a plurality of addressable storage cells, said data storage member storing a plurality of pages in different regions thereof and storing a table of page descriptor words, said table comprising a page descriptor word for each of said pages, each of said page descriptor words comprising the address of the base of the corresponding page; a first register for storing the address of the base of said page descriptor table; a second register for storing a first representation of the location of the page descriptor word of one of said pages relative to the base of said page descriptor table and a second representation of the location of one of the data words of said one page relative to the base of said one page; first combining means for combining the first representation in said second register with the contents of said first register to generate a second signal group representing the address of the page descriptor word of said one page; means controlled following the generation of said second signal group for transferring said second signal group to said data storage member to control said data storage member to deliver a signal set representing the page descriptor word of said one page; and second combining means for combining the second representation in said second register with said signal set to generate the address of said one data word of said one page.

11. The combination of claim 10 wherein said data storage member further stores a plurality of program segments in different regions thereof, and wherein the data words of said pages comprise the address of the base of respective ones of said segments; said combination further including apparatus for generating a third signal group representing the location of one of the data words of one of said segments relative to the base of said one segment; means controlled following the generation of said third signal group for transferring said address of said one data word of said one page to said data storage member to control said data storage member to deliver a second signal set representing said one word of said one page; and third combining means for combining said third signal group with said second signal set to generate the address of said one data word of said one segment.

12. In combination: a data storage member for storing a data word in each one of a plurality of addressable storage cells; a plurality of registers, each of said registers storing a representation of the location of a respective first one of said cells, each of said first cells storing a respective reference address; apparatus for generating a first signal group representing the location of a second one of said cells relative to a reference address when said apparatus requires to communicate with said one second cell and for generating a second signal identifying one of said registers; means controlled by said second signal for responding to the contents of the identified one of said registers to generate a second signal group representing the address of the corresponding one of said first cells; means for transferring said second signal group to said data storage member to control said data storage member to deliver a signal set representing the contents of said one first cell; and combining means for combining said first signal group with said signal set to generate the address of said one second cell.

13. In combination: a data storage member for storing a data word in each one of a plurality of addressable storage cells; a first register for storing a first reference address; a plurality of second registers, each of said second registers storing the address of a respective first one of said cells relative to said first reference address, each of said first cells storing a respective second reference address; apparatus for generating a first signal group representing the loctaion of a second one of said cells relative to a second reference address when said apparatus requires to communicate with said one second cell and for generating a second signal identifying one of said second registers; first combining means responsive to said second signal for combining the contents of the identified one of said second registers with the contents of said first register to generate a second signal group representing the address of the corresponding one of said first cells; means controlled following generation of said second signal group for transferring said second signal group to said data storage member to control said data storage member to deliver a signal set representing the contents of said one first cell; and second combining means for combining said first signal group with said signal set to generate the address of said one second cell.

14. In combination: a data storage member for storing a data word in each of a plurality of addressable storage cells; apparatus for generating a signal group representing the location of one of said cells relative to a reference address when said apparatus requires to communicate with said one cell; means for generating a first signal set; means responsive to a first portion of said signal group and said first signal set for controlling generation of a second signal set representing said reference address; and means responsive to a second portion of said signal group and said second signal set for generating the address of said one cell.

15. In combination: a data storage member for storing a data word in each one of a plurality of addressable storage cells; apparatus for generating a first signal group; means for generating a first signal set; means responsive to a first portion of said first signal group and said first signal set for generating a second signal group representing the address of one of said cells; means for transferring said second signal group to said data storage member to control said data storage member to deliver a second signal set representing the contents of said one cell; and means responsive to a second portion of said signal group and said second signal set for generating a third signal group representing the address of a second of said cells.

16. In combination: a data storage member for storing a data word in each one of a plurality of addressable storage cells; apparatus for generating a first signal group representing the location of one of said cells relative to a reference address when said apparatus requires to communicate with said one cell; means for generating a first signal set; means for combining a first portion of said first signal group and said first signal set for generating a second signal group; means responsive to said second signal group for controlling generation of a second signal set representing said reference address; and means for combining a second portion of said first signal group and said second signal set for generating the address of said one cell.

17. In combination: a data storage member for storing a data word in each one of a plurality of addressable storage cells; apparatus for generating a first signal group representing the location of a first of said cells relative to a reference address when said apparatus requires to communicate with said first cell; means for generating a first signal set; means for combining a first portion of said first signal group and said first signal set for generating a second signal group representing the address of a second of said cells, said second cell storing said reference address; means for transferring said second signal group to said data storage member to control said data storage member to deliver a second signal set representing the contents of said second cell; and means for combining a second portion of said first signal group and said second signal set for generating the address of said first cell.

18. In combination: a data storage member for storing a data word in each one of a plurality of addressable storage cells, said data storage member storing a plurality of data word pages in different contiguous cell groups thereof and storing a table of page descriptor words in a set of cells, said table comprising a page descriptor word for each of said pages, each of said page descriptor words comprising the address of the base of the contigous cell group storing the corresponding page; apparatus for generating a first signal group representing the relative location of one of said data words in one of said pages; means for generating a first signal set; means for combining a first portion of said first signal group and said first signal set for generating a second signal group representing the address of the one of the cells in said cell set storing the descriptor word corresponding to said one page; means for transferring said second signal group to said data storage member to control said data storage member to deliver a second signal set representing the descriptor word contents of said one cell; and means for combining a second portion of said first signal group and said second signal set for generating the address of said one data word.

References Cited

UNITED STATES PATENTS

| | | | |
|---|---|---|---|
| 3,036,773 | 5/1962 | Brown | 235—157 |
| 3,222,649 | 12/1965 | King | 340—172.5 |
| 3,267,433 | 8/1966 | Falkoff | 340—172.5 |
| 3,299,261 | 1/1967 | Steigerwalt | 235—175 |

PAUL J. HENON, *Primary Examiner.*

I. S. KAVRUKOV, *Assistant Examiner.*